(12) United States Patent  
Hoellriegl et al.

(10) Patent No.: US 9,044,888 B2  
(45) Date of Patent: Jun. 2, 2015

(54) APPARATUS FOR SHAPING PLASTICS MATERIAL PRE-FORMS INTO PLASTICS MATERIAL CONTAINERS WITH PRESSURE PADS

(75) Inventors: Thomas Hoellriegl, Teublitz (DE); Heinrich Deyerl, Teunz (DE); Florian Geltinger, Donaustauf (DE); Gerhard Schuster, Pfakofen (DE); Thomas Philipp, Sinzing-Eilsbrunn (DE)

(73) Assignee: KRONES AG (DE)

( * ) Notice: Subject to any disclaimer, the term of this patent is extended or adjusted under 35 U.S.C. 154(b) by 332 days.

(21) Appl. No.: 13/584,599

(22) Filed: Aug. 13, 2012

(65) Prior Publication Data

US 2013/0043622 A1 Feb. 21, 2013

(30) Foreign Application Priority Data

Aug. 19, 2011 (DE) .......................... 10 2011 052 865

(51) Int. Cl.
*B29C 49/48* (2006.01)
*B29C 49/56* (2006.01)

(52) U.S. Cl.
CPC .............. *B29C 49/48* (2013.01); *B29C 49/56* (2013.01); *B29C 2049/4864* (2013.01)

(58) Field of Classification Search
CPC .. B29C 49/48; B29C 49/56; B29C 2049/4864
USPC ................................................. 425/522, 541
See application file for complete search history.

(56) References Cited

U.S. PATENT DOCUMENTS 3,782,879 A * 1/1974 Mnilk et al. ................... 425/541  
4,427,360 A * 1/1984 Albrecht et al. .............. 425/541  
(Continued)

FOREIGN PATENT DOCUMENTS

| CN | 1449325 | 10/2003 | .............. B29C 33/20 |
| DE | 202004011785 | 10/2004 | .............. B29C 49/48 |

(Continued)

OTHER PUBLICATIONS

First Office Action, corresponding Chinese Patent Application Serial No. 201210297386.8, dated May 28, 2014 (2 pgs).

(Continued)

*Primary Examiner* — Robert B Davis  
(74) *Attorney, Agent, or Firm* — Hayes Soloway P.C.

(57) ABSTRACT

An apparatus for shaping plastics material pre-forms into plastics material containers with a blow mold which has at least two blow mold parts which are arranged so as to be movable with respect to each other on first and second blow mold carrier parts. A pressure pad arrangement is arranged between at least one blow mold carrier part and the blow mold part. The pressure pad arrangement is designed in such a way that the force acting between the blow mold carrier part and the blow mold part has a first force component which acts in a first pre-set region in the peripheral direction of the blow mold part and a second force component which acts in a second pre-set region in the peripheral direction of the blow mold part.

21 Claims, 5 Drawing Sheets

(56) References Cited

U.S. PATENT DOCUMENTS

| | | | | |
|---|---|---|---|---|
| 4,762,486 | A * | 8/1988 | Windstrup et al. | 425/541 |
| 5,346,386 | A * | 9/1994 | Albrecht et al. | 425/541 |
| 5,411,391 | A * | 5/1995 | Albrecht et al. | 425/541 |
| 5,736,168 | A * | 4/1998 | Goyal et al. | 425/522 |
| 6,099,286 | A * | 8/2000 | Nitsche | 425/541 |
| 7,048,531 | B2 | 5/2006 | Bianchini | 425/541 |
| 8,070,470 | B2 * | 12/2011 | Tsau et al. | 425/522 |
| 2005/0013891 | A1 * | 1/2005 | Hall | 425/522 |
| 2005/0142243 | A1 * | 6/2005 | Tsau et al. | 425/522 |

FOREIGN PATENT DOCUMENTS

| | | | | |
|---|---|---|---|---|
| DE | 60113860 | 7/2006 | | B29C 33/20 |
| WO | WO2011026805 | 3/2011 | | B29C 49/48 |

OTHER PUBLICATIONS

German Search Report issued in corresponding application No. 102011052865.2, dated Feb. 8, 2012 (5 pgs).

European Search Report (w/o English translation) issued in corresponding application No. 12179851.6, dated Dec. 7, 2012 (8 pgs).

* cited by examiner

APPARATUS FOR SHAPING PLASTICS MATERIAL PRE-FORMS INTO PLASTICS MATERIAL CONTAINERS WITH PRESSURE PADS

BACKGROUND OF THE INVENTION

The present invention relates to an apparatus and a method of shaping plastics material pre-forms into plastics material containers. Apparatus and methods of this type have long been known from the prior art. In this way, it is known for example for blow moulds or blow mould parts to be arranged on carriers and for these carriers to be capable of being folded together and unfolded, in which case plastics material pre-forms are expanded to form plastics material containers in the interior of the blow mould, in particular by being acted upon with compressed air, in a closed state of this blow mould.

In this case two mould carrier shells are provided as a rule, on which the blow mould parts are arranged in a fixed manner in each case. These mould carrier shells are arranged in turn on a blow mould carrier or a blow mould carrier part respectively. In this case it is also known for a three-dimensional stamped seal, which surrounds the half-shell mould carrier shell in the outer radius thereof, to be capable of being arranged for example on a side of the pressure pad between this blow mould carrier and the mould carrier shell. This seal forms in this case a cavity which can be acted upon with compressed air during the blow moulding procedure. As a result of this stressing with compressed air the two blow mould parts are pressed against each other during the actual shaping procedure and, in this way, inaccuracies of the container thus formed, in particular at the transitions of the two blow mould parts, can be prevented In this case fastening means for the mould carrier shell on the blow mould carrier are usually attached outside the sealing window mentioned above. These points on the mould carrier and also on the mould carrier shell are strongly affected by the blow moulding process, however, so that relatively large deformations can occur here during the blow moulding process.

The object of the invention is to satisfy the constantly increasing quality requirements made of PET bottles, and to produce higher-grade products by the aforesaid blow moulding process. A higher quality of the plastics material container produced is to be achieved, in particular at the transition region which is formed by the meeting of the two blow mould parts. In addition, an opportunity should be provided in order to increase the stability in the mould carrier and the mould carrier shell during the blow moulding process.

SUMMARY OF THE INVENTION

An apparatus according to the invention for shaping plastics material pre-forms into plastics material containers has a blow mould which has at least two blow mould parts which are arranged so as to be movable with respect to each other and which in a closed state of the blow mould form a cavity, in the interior of which the plastics material pre-forms are capable of being expanded to form the plastics material containers by being acted upon with a flowable medium (and in particular a gaseous medium and in particular air), the first blow mould part being arranged on a first blow mould carrier part and the second blow mould part being arranged on a second blow mould carrier part and the first blow mould carrier part being movable with respect to the second blow mould carrier part in order to open and close the blow mould.

In addition, a pressure pad arrangement is arranged between at least one blow mould carrier part and the blow mould part arranged on this blow mould carrier part, a pressure chamber or a pressure pad device of this pressure pad arrangement being capable of being acted upon with a flowable pressure medium, in order to force apart from each other the at least one blow mould carrier part and the blow mould part arranged on latter by a force acting between the blow mould carrier part and the blow mould part.

According to the invention the pressure pad arrangement is designed in such a way that the force acting between the blow mould carrier part and the blow mould part has a first force component which acts in a first pre-set region—preferably capable of being spatially defined or bounded respectively—in the peripheral direction of the blow mould part and a second force component which acts in a second pre-set region in the peripheral direction of the blow mould part, the first region and the second region being arranged at a distance from each other and the directions of the first force component and the second force component extending at an angle different from 0 degrees with respect to each other. The pre-set regions in which the force components act thus preferably result from a shape—in particular geometrical—of the pressure pad arrangement.

The arrangement of the blow mould part on the blow mould carrier part is to be understood in that this blow mould part is arranged at least indirectly, i.e. optionally for further elements, on the blow mould carrier part. It is customary for the blow mould part to be arranged in turn on a carrier shell and for this carrier shell preferably to be arranged on the blow mould carrier part, the pressure pad arrangement mentioned being formed between the blow mould carrier part and the aforesaid carrier shell. In the prior art it is usual for the blow mould carrier part and the blow mould part to have arranged between them only one uniform pressure pad which can be acted upon with compressed air. When the pressure pad is acted upon a resulting force acts accordingly in only one direction, so that the blow mould and the blow mould carrier are pressed apart in this resulting direction. In this case this only one application of force can result during the blow moulding procedure in stresses which eventually affect the shape of the plastics material container formed in this way. The flowable medium with which the pressure pad is acted upon is in particular a gaseous medium, preferably air and optionally sterile air.

On account of the procedure proposed according to the invention the position and design of the pressure pad are arranged in such a way that the deformation in the mould carrier and in the (mould) carrier shell is reduced. More precisely, the forces applied by the pressure pad are divided into at least two components which act upon the carrier shell or the blow mould respectively at different angles in order to reduce the risk of stresses during the expansion procedure in this way. In the case of an advantageous embodiment the two force components are independent of each other and, in particular, are preferably also capable of being set—in particular with respect to their magnitude—independently of each other.

It is preferable for no force (apart from a force formed vectorially from the force components), or only a force which is considerably lower than the force components and which presses the blow mould part and the blow mould carrier part apart from each other, to act in the peripheral direction between the two regions, at least locally.

In the case of an advantageous embodiment the apparatus for shaping plastics material pre-forms also has a stressing device which acts upon the plastics material pre-forms with a gaseous medium and, in particular, with compressed air during the expansion procedure in order to expand them.

In addition, the apparatus preferably also has a stretch bar which stretches the plastics material pre-forms in their longitudinal direction during the expansion procedure.

In the case of a further advantageous embodiment a locking device is also provided which locks the mould carrier parts together in particular during the expansion procedure. In this case this locking can engage in a cam-controlled manner and can be arranged in such a way that the two mould carrier parts are locked together at the beginning of the expansion procedure and also in the course of the expansion procedure. As mentioned, the design with the two force components permits a more uniform pressing of the two blow mould parts against each other.

In the case of a further advantageous embodiment the apparatus has only one pressure pad arrangement of this type on one of the two mould carriers.

In the case of a further advantageous embodiment the angle between the direction of the first force component and the direction of the second force component is between 10° and 170°, preferably between 20° and 160°, preferably between 30° and 150°, preferably between 45° and 135°, preferably between 60° and 120°, and in a particularly preferred manner between 75° and 105°. These arrangements of the directions of force permit an expedient pressing of the two blow mould parts against each other in a particularly advantageous manner. In this way, in particular, the pressure pad is arranged in a V-arrangement, so that the two forces are at the aforesaid angle with respect to each other. In the case of an advantageous embodiment the carrier shell is held on the blow mould carrier part by way of a retention means with positive locking, so that a fixed position of the aforesaid pressure pad is also achieved.

It would be possible that at least one of the blow mould carrier parts and preferably both blow mould carrier parts have a V-shaped design at least at a side facing towards the blow mould parts and/or the mould carrier shells. Also, it would be conceivable that only one of the blow mould carrier parts comprises the above-mentioned V-shaped design and the other blow mould carrier part a different design, for example a circular shaped design or an oval design (and generally an at least section wise curved design). Therefore, in this case the reception region of the blow mould carrier part for receiving the blow mould comprises a different design than the reception region of the other blow mould carrier part. Especially the blow mould carrier part at which also one or the pressure pad is arranged comprises the V-shaped design.

A V-shaped design is understood to be a V-shaped form in a closer meaning which comprises two arms which are angled with respect to each other and also a design in which the angled arms are connected by at least one and preferably exactly one further section, for example a section, which is perpendicular to a bisecting line of an angle formed between the two arms.

Also the blow mould parts may comprise on their sides which are faced to the blow mould carrier parts a curved (for example circular) design or a V-shaped design. Also it would be conceivable that one of the two blow mould parts comprises a V-shaped design and the other a curved or circular design. A circular or V-shaped design is understood to mean especially a geometrical shape in a plane which is perpendicular to a longitudinal direction of the blow mould.

Also it would be possible that one blow mould part is directly received by the blow mould carrier part which means without providing a blow mould carrier shell. In this case the corresponding blow mould part could be in direct contact with the blow mould carrier part or between the blow mould part and the blow mould carrier part a pressure pad could be arranged.

In the case of a further advantageous embodiment the pressure pad arrangement has a first pressure pad device and a second pressure pad device which are separated from each other at least in part or locally respectively and are preferably separated from each other completely. On account of these aforesaid pressure pad devices the two forces mentioned above can also optionally be applied independently of each other to the blow mould or the carrier shell respectively. It would also be possible, however, for only one pressure pad device to be provided, but for this to be arranged in such a way that the two forces mentioned above are produced. This can be achieved for example by a cross member inside an individual pressure pad device, which ensures that no forces or only slight forces are exerted in the peripheral direction of the blow mould in a central region between the two force components mentioned.

An at least partial separation of the pressure pad devices is understood to be, in particular, that although these pressure pad devices can be connected to each other by way of a connecting portion, this connecting portion extends not along an entire lateral edge of at least one pressure pad device but only along a portion of such a lateral edge, which is preferably smaller than 50% of the lateral edge, preferably smaller than 30% of the lateral edge and preferably smaller than 20% of the lateral edge.

In other words, with a local separation the pressure pad devices are preferably connected to each other only by way of a connecting portion which extends over less than 20% of the periphery of at least one of the two pressure pad devices, preferably over less than 10% of the periphery and preferably over less than 5% of the periphery.

In the case of a further advantageous embodiment the apparatus has a first supply device, in order to supply the flowable medium to the first pressure pad device, and a second supply device separate from it, in order to supply the flowable medium to the second pressure pad device. In this way, a different control of the two pressure pad devices is possible. In addition, the supply ducts for the two pressure pad devices can be separated from each other completely, but it would also be possible for the flowable medium, i.e. the compressed air, to be supplied to the two pressure pad devices by way of a common connection.

In the case of a further advantageous embodiment the pressure pad arrangement has a continuous sealing device which demarcates the space acted upon with the flowable pressure medium, i.e. the pressure chamber, and this sealing device abuts against a flat wall area. In the prior art it is usual for sealing devices abutting in a three-dimensional manner to be used, i.e. in particular sealing devices which also extend along a curved portion of the carrier shell or the blow mould or blow mould carrier respectively. In this embodiment it is proposed that the sealing device should extend only along one plane, i.e. a straight plane and thus only in the two-dimensional range. In this way an improved sealing effect is possible.

In the case of a further advantageous embodiment the pressure pad arrangement is arranged between the blow mould carrier part and a carrier shell holding the blow mould part. This carrier shell can be designed in such a way in this case that the blow mould part is designed to be releasable from this carrier shell.

In the case of a further advantageous embodiment the apparatus has a holding device for holding the blow mould part on the blow mould carrier part, and this holding device is arranged in a peripheral direction of the blow mould between regions of the pressure pad arrangement. In the case of this embodiment it is proposed that an arrangement—preferably central with respect to the pressure pad arrangement—of the holding device is provided, which can be provided for example—if only one pressure pad device is provided—on a corresponding bounding cross member.

It is preferable, however, for the holding device to be arranged between the first pressure pad device and the second pressure pad device. It is preferable for a force not to be exerted in the direction of the blow mould by the pressure pad itself in a region of this holding device.

The present invention additionally relates to a method of shaping plastics material pre-forms into plastics material containers, in which a blow mould is provided which has two blow mould parts which are arranged so as to be movable with respect to each other and which in a closed state of the blow mould form a cavity, in the interior of which the plastics material pre-forms are expanded to form the plastics material containers by being acted upon with a flowable medium and, in particular, with compressed air.

In this case the first blow mould part is arranged on a first blow mould carrier part and the second blow mould part is arranged on a second blow mould carrier part. The first blow mould carrier part is moved with respect to the second blow mould carrier part in order to open and close the blow mould. In addition, a pressure pad arrangement is arranged between at least one blow mould carrier part on the blow mould part arranged (at least indirectly) on this blow mould carrier part, a pressure chamber or a pressure device of this pressure pad arrangement being acted upon with a flowable pressure medium in order to move apart the at least one blow mould carrier part and the blow mould part arranged on the latter by a force acting between the blow mould carrier part and the blow mould part.

According to the invention the pressure pad arrangement is designed in such a way that the force acting between the blow mould carrier part and the blow mould part has a first force component, which acts in a first pre-set region in the peripheral direction of the blow mould part and a second force component, which acts in a second pre-set region in the peripheral direction of the blow mould part, the first region and the second region being arranged at a distance from each other and the directions of the first force component and the second force component extending at an angle different from 0 degrees with respect to each other.

It is therefore proposed in terms of the method that the pressure pad arrangement should be designed in such a way that at least two force components are provided which act upon the blow mould part or a carrier shell holding the blow mould part respectively.

In the case of a preferred method a holding force acting between the blow mould part and the blow mould carrier part acts in the peripheral direction of the blow mould between the first force component and the second force component.

BRIEF DESCRIPTION OF THE DRAWINGS

Further advantages and embodiments are evident from the accompanying drawings. In the drawings

DETAILED DESCRIPTION OF THE INVENTION

Figure 1:
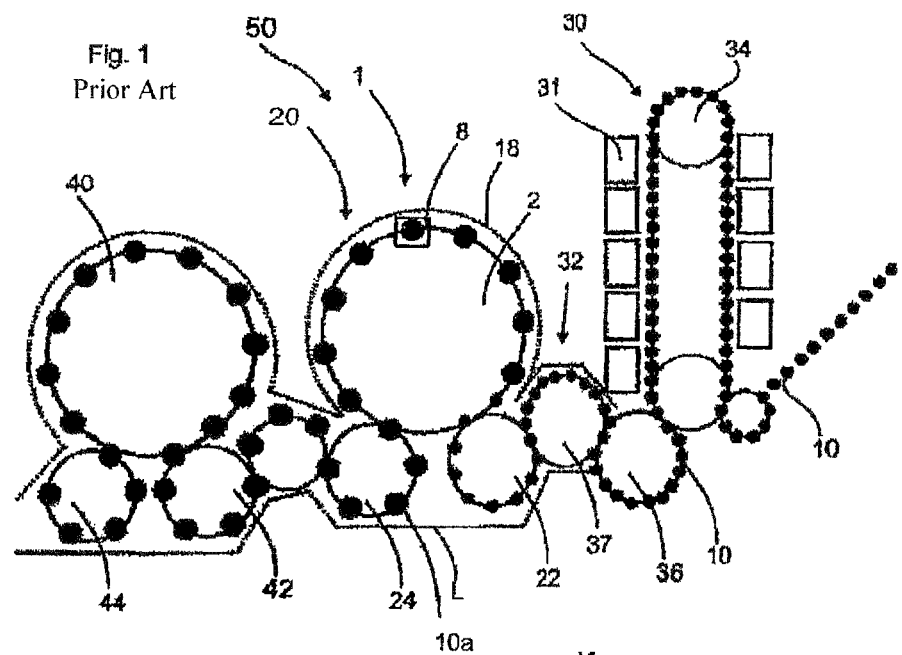
FIG. 1 shows a treatment plant for containers according to the prior art.

FIG. 1 is a diagrammatic illustration of a plant for producing plastics material containers according to the prior art. This plant 50 has a heating device 30 in which plastics material pre-forms 10 are heated. In this case these plastics material pre-forms 10 are conveyed through this heating device 30 by means of a conveying device 34, such as a circulating chain here, and are heated in this case by a plurality of heating elements 31 This heating device 30 has attached to it a transfer unit 36 which transfers the pre-forms 10 to a sterilization device 32. This sterilization device 32 likewise has in this case a conveying wheel 37 and sterilization elements can be arranged on this conveying wheel 37 or even in a stationary manner. Sterilization by hydrogen peroxide gas or even by electromagnetic radiation is possible for example in this region. In particular, an internal sterilization of the pre-forms is carried out in this region.

The reference number 20 designates in its entirety a clean room, the external boundaries of which are indicated here by the dotted line L. In a further preferred embodiment the clean room 20 is not only arranged in the region of the conveying wheel 2 and the filling device 40, but it already starts if possible in the region of the heating device 30, the sterilization device 32, the supply of the plastics material pre-forms and/or the production of the plastics material pre-forms. It is evident that this clean room 20 starts in the region of the sterilization unit 32. Separating-out devices can be provided in this region in order to introduce the plastics material pre-forms into the clean room 20 without too much gas flowing inside the clean room in this case and thus being lost.

As indicated by the broken line L, the clean room is adapted to the external shape of the individual components of the plant. In this way the volume of the clean room can be reduced.

The reference number 1 designates a shaping apparatus as a whole, in which a plurality of blow moulding stations or shaping stations 8 are arranged on a conveying wheel 2 only one of these blow moulding stations 8 being shown here. The plastics material pre-forms 10 are expanded by these blow moulding stations 8 to form containers 10a. Although it is not shown in detail here, the entire area of the conveying device 2 is not situated inside the clean room 20, but the clean room 20 or isolator is designed as it were in the form of a mini isolator inside the apparatus as a whole. In this way it would be possible for the clean room to be designed in the form of a duct at least in the region of the shaping apparatus 1.

The reference number 22 relates to a supply device which transfers the pre-forms to the shaping device 1, and the reference number 24 relates to a removal device which removes the plastics material containers 20 produced from the shaping apparatus 1. It will be seen that in the region of the supply device 22 and the removal device 24 the clean room 20 has recesses in each case which receive these devices 22, 24. In this way, a transfer of the plastics material pre-forms 10 to the shaping apparatus 1 or respectively a transfer of the plastics material containers 10a from the shaping apparatus 1 can be carried out in a particularly advantageous manner.

The expanded plastics material containers are transferred to a filling device 40 by a transfer unit 42 and they are then removed from this filling device 40 by way of a further conveying unit 44. In this case the filling device 40 is also situated inside the aforesaid clean room 20. In the case of the filling device it would also be possible for the entire filling device 40 with for example a reservoir for a beverage not to be arranged completely inside the clean room 6, but also in this case only those areas in which the containers are actually guided. In this respect, it would also be possible for the filling device to be designed in a similar manner to the apparatus 1 for shaping plastics material pre-forms 10.

As mentioned, the clean room 20 is reduced in the region of the apparatus 1 to as small an area as possible, namely essentially to the blow moulding stations 8 themselves. As a result of this compact design of the clean room 20 it is possible in an easier and more rapid manner to produce a clean room generally and, in addition a lower outlay is required in order to keep the system sterile in the operative phase. Less sterile air is also necessary, and this leads to smaller filter units and the risk of uncontrolled swirl formation is also reduced.

Figure 2:
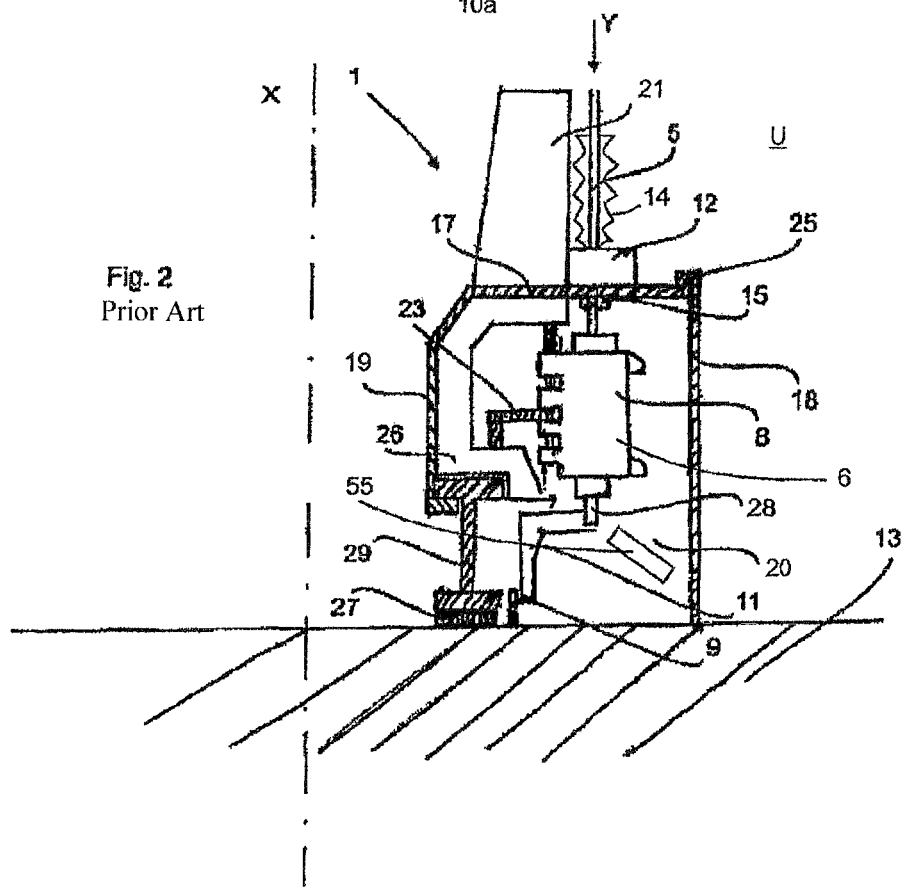
FIG. 2 is an illustration of a blow moulding station according to the prior art.

FIG. 2 is a detailed illustration of the apparatus 1 in the region of a blow moulding station 8. A plurality of blow moulding stations 8 of this type are moved by a conveying device 2 or a carrier so as to rotate about an axis X. As is evident from FIG. 2, the blow moulding designed in the form of a duct here. This clean room 20 is closed off by a movable lateral wall 19 and a cover 17 formed in one piece with this lateral wall 19. In this case this lateral wall 19 and the cover 17 rotate jointly with the blow moulding station 8.

The reference number 18 relates to a further wall which bounds the clean room 16. This wall 18 is here a wall which is situated on the outside and which is arranged in a stationary manner. The cover 17 and the wall 18 have provided between them a sealing device 25 which seals off from each other the elements 17 and 18 movable with respect to each other, for example, as mentioned above, by using a surge chamber. The lower region of the wall 18 is arranged on a floor 13 in a fixed and sealing manner. A carrier 26, which likewise moves in a rotating manner and on which a holding device 23 which holds the blow moulding station 8 is in turn provided, is provided inside the clean room 20 and in this case abutting directly against the wall 19.

The reference number 11 relates to a follower device which can be actuated by a guide cam 9 in order to open and close the blow moulding station on its path through the clean room 6, in order in particular to introduce the plastics material pre-form into the blow moulding station and also to remove it again. In this case a guide cam 9 is also arranged inside the clean room 20. It would also be possible, however, by way of example for a portion 11 below the individual blow moulding stations 8 to be brought out of the clean room 20.

The conveying device 2 can have still further elements which are arranged above the clean room 20.

In this case the carrier 26 is arranged in a fixed manner on a holding body 29 and this holding body in turn is movable with respect to the floor 13. In this case the reference number 27 relates to a further sealing device which in this area too seals off the regions 13 and 29 which are movable with respect to each other.

The reference number 5 relates to a stretch bar which is movable with respect to the blow moulding station in order to stretch the plastics material pre-forms 10 in their longitudinal direction. In this case a slide 12 opposite which the stretch bar is movable in the direction Y is arranged on the cover 17 here. The reference number 21 relates to a further holding means for this slide 12 of the stretch bar 5.

It is evident that specific regions of the stretch bar are both outside the clean room 20 and inside the clean room 20 during the blow moulding procedure. For this purpose it is possible for a protective device such as a folding bellows to be provided outside the clean room 20 or above the slide 12, the folding bellows 14 surrounding the stretch bar 5 so that no region of the stretch bar 5 comes directly into contact with the outer environment. The reference letter U designates the (non-sterile) environment of the clean room 20. The reference number 28 designates a carrier for carrying a floor mould which likewise forms a component of the blow mould 4. This carrier is likewise movable in the direction Y in this case.

The reference number 55 relates to a sterilization device which in this case is preferably arranged in the interior of the clean room 20 and is used for the sterilization of the individual shaping stations or components of these shaping stations 8. This sterilization device 55 can act in this case upon the shaping stations 8 for example with hydrogen peroxide or another sterilization agent. In this case the sterilization device 55 can be arranged so as to be stationary and the shaping stations can move with respect to this sterilization device 55. This sterilization device or stressing device 55 can be situated on the conveying wheel 2 or on the vertical wall 18 or can be arranged so as to be generally stationary and can consist of nozzles or the like. In addition, it is advantageous for sterile air to be introduced into the clean room 20 in order to sterilize the clean room 20 by way of the aeration system.

The blow moulds (not shown) are arranged inside the blow mould carriers 6. More precisely, two blow mould carrier parts can be provided in this case which are pivotable with respect to each other and which hold one blow mould part in each case. The blow moulds can be opened by this pivoting procedure for the introduction of plastics material pre-forms and for the removal of finished, blow-moulded containers. These blow mould carriers and blow moulds are likewise arranged inside the clean room in this case.

It would also, however, be possible and preferred (other than as shown in FIG. 2) for the conveying device 2 or the carrier to have a C-shaped external periphery which also forms the outer walls of the clean room in part. In this way, this C-shaped clean room wall turns with the conveying device 2, i.e. the blowing wheel. In this embodiment the lower boundary of the clean room is arranged at a distance from the floor 13 and moves relative to the floor. In this way, the clean room can be made even smaller than shown in FIG. 2. In this case it is preferable for this C-shaped profile of the conveying device, which forms both an inner wall and a lower and upper cover of the clean room here, to be sealed off only with respect to the outer wall of the clean room. This outer wall is preferably arranged in a stationary manner in this case.

The arrangement shown in FIGS. 1 and 2 relates to a sterile blow mould arrangement. The present invention, however, is capable of being applied equally well in the case of conventional or non-sterile blow moulding machines. In addition, the plant concept shown in FIG. 1 is capable of being applied both for sterile machines and for non-sterile machines.

Figure 3A:
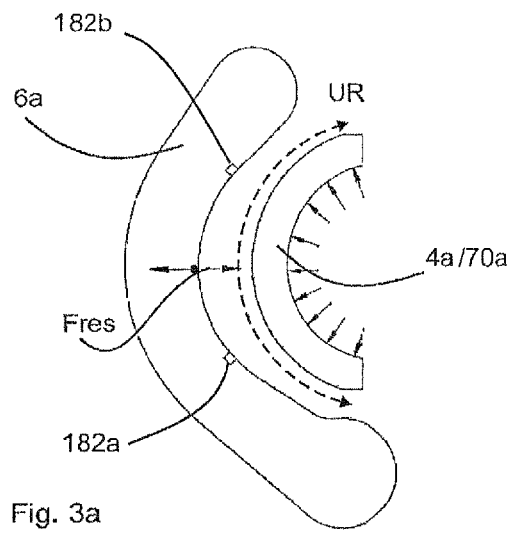
FIGS. 3a, b are two diagrammatic illustrations to explain the invention.
Figure 3B:
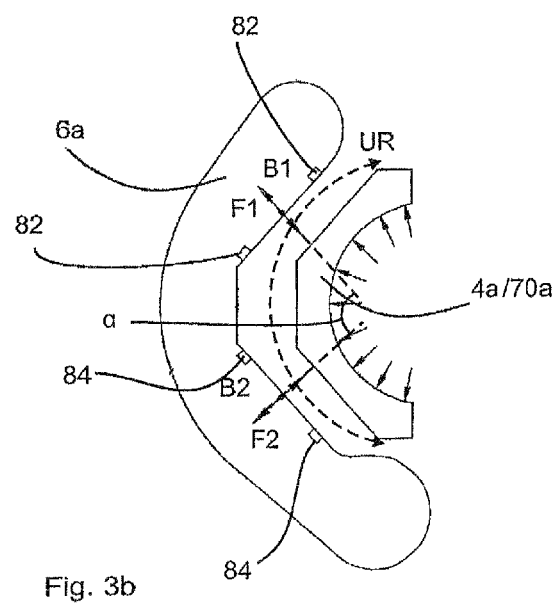

FIGS. 3a and 3b are two diagrammatic illustrations to explain the problem underlying the invention and its solution. FIG. 3a shows the relationships according to the prior art. In this case a blow mould carrier unit 6a on which a blow mould

4*a* is arranged (optionally by way of a carrier shell), is provided here. It would also be possible, however, for the blow moulds to be fastened directly to the carrier. A pressure pad, which is provided in the peripheral direction UR and which is formed between the two seal portions 182*a* and 182*b*, is arranged between the blow mould carrier 6*a* and the blow mould 4*a*. This pressure pad thus produces a resulting force Fres which acts horizontally here. The small force arrows in the interior of the blow moulds relate to the forces which arise on account of the actual blow moulding procedure. This means that in this way stresses and also deformation of the blow mould or even the blow mould carrier shell can occur in this way.

FIG. 3*b* shows an arrangement according to the invention In contrast to the prior art two pressure pads are provided here, which are arranged at a distance from each other by the continuous seals 82, 84 and which exert force components F1 and F2, which are orientated at the pre-set angle with respect to each other, upon the blow mould 4*a* or the carrier shell of the blow mould respectively. The reference numbers 82, 84 thus designate sealing devices which surround or form the two pressure pads. On account of the action with two force components F1 and F2, a force effect which is more uniform as a whole can be exerted upon the blow mould 4*a* or the carrier shell respectively. These two regions B1 and B2 in which the force components act are arranged at a distance from each other here in the peripheral direction UR of the blow mould. The angle α at which the two forces F1 and F2 extend with respect to each other is preferably in a range of between 70° and 110°.

The peripheral direction is advantageously also a peripheral direction of the plastics material pre-form to be expanded or the plastics material container respectively. The angle α mentioned is advantageously formed in a plane formed by the peripheral direction. This plane is advantageously at a right angle in this case to a longitudinal direction of the plastics material pre-form and is advantageously parallel to the plane of FIG. 3*b*.

Figure 4:
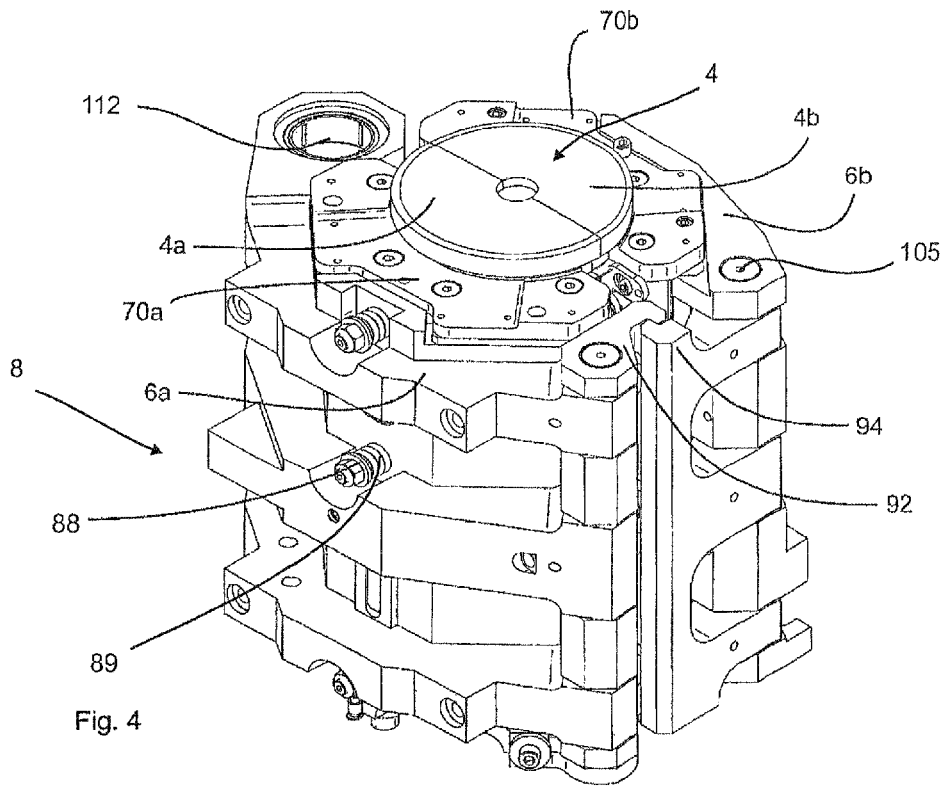
FIG. 4 shows a blow moulding station according to the invention for shaping plastics material pre-forms into plastics material containers.

FIG. 4 is a perspective illustration of a blow moulding station 8 according to the invention. In this case this blow moulding station 8 has two blow mould parts 4*a*, 4*b* which are shown in a closed state here. The cavity mentioned above, inside which the plastics material pre-forms are expanded to form the plastics material containers, is formed between these two blow mould parts 4*a*, 4*b*.

The blow mould part 4*a* and accordingly also the blow mould part 4*b* are arranged in a fixed manner, for example clamped or screwed, on blow mould carrier shell parts 70*a* 70*b*. These blow mould carrier shells 70*a*, 70*b* are in turn arranged on blow mould carrier parts 6*a* and 6*b*. These blow mould carrier parts are pivotable with respect to a common pivot mounting 112, in order to open and close the blow mould.

The reference number 92 relates to a first locking element into which a second locking element 94 for locking the blow mould during the expansion procedure engages. For this purpose this second locking element 94 is pivotable with respect to a pivot shaft 105.

The reference number 88 relates to fastening means or holding devices respectively, which are used for fastening the blow mould carrier shells 70*a* and 70*b* to the respective blow mould carrier parts 6*a*, 6*b*.

Figure 5:
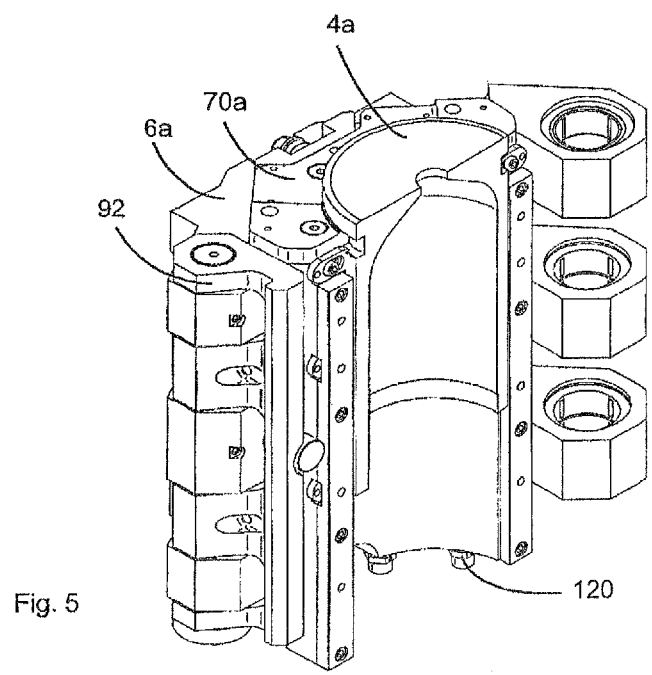
FIG. 5 is a partial view of a blow moulding station for shaping plastics material pre-forms into plastics material containers.

FIG. 5 is a part illustration of the apparatus shown in FIG. 4, i.e. a blow mould carrier part 6*a* with the blow mould shell part arranged in it and the blow mould part 4*a*. In addition, an attachment 120, by way of which a tempering medium, for example a heated liquid, can be supplied to the blow mould carrier shell 70*a*, is evident here.

Figure 6:
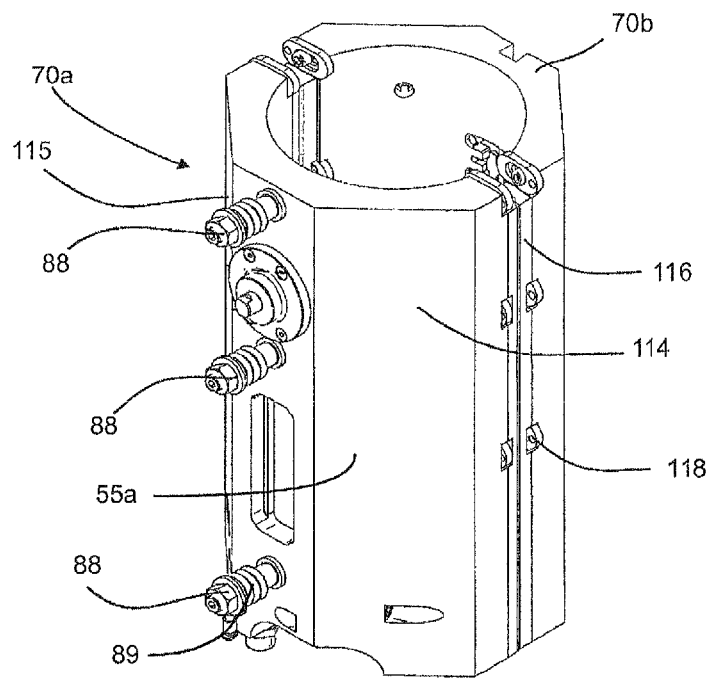
FIG. 6 is an illustration of a carrier shell for carrying blow moulds.

FIG. 6 is an illustration of the blow mould carrier shells 70*a*, 70*b*. It is evident that they have a polygonal external periphery here, i.e. the two carrier shell parts 70*a* and 70*b* have four edges in each case on their outer faces. The reference numbers 114 and 115 relate to faces of the blow mould carrier shells which are stressed by the pressure pad (not shown) during operation. Here, the corresponding forces exerted by the pressure pads act substantially at a right angle to the two faces 114 and 115. The pressure pads are therefore also bounded by the faces 114, 115 or portions of these faces respectively. The faces are flat or respectively two-dimensional here. The sealing devices 82 and 84 abut against these faces.

The reference number 116 relates to a holding element by which the blow mould parts (not shown) are held on the blow mould carrier shells 70*a*, 70*b*. The reference number 118 designates an engagement means, such as a claw, which holds the blow mould parts in a closed state. It is advantageous in this case for this engagement means to be pivotable, so that the blow mould parts can be uncoupled from the carrier shells by way of this pivoting procedure The fastening means 88, by which the blow mould carrier shells can be arranged on the blow mould carriers, are again likewise evident here. These fastening means are arranged in this case between the two faces 115 and 114 and thus between those areas in which the respective force components F1 and F2 are applied in operation. A pressure pad is not applied to the second blow mould shell part 70*b* in operation, i.e. the pressure pad is applied only to one of the two blow mould carrier shell parts here. This is also sufficient, however, to force the two blow mould parts towards each other.

Figure 7:
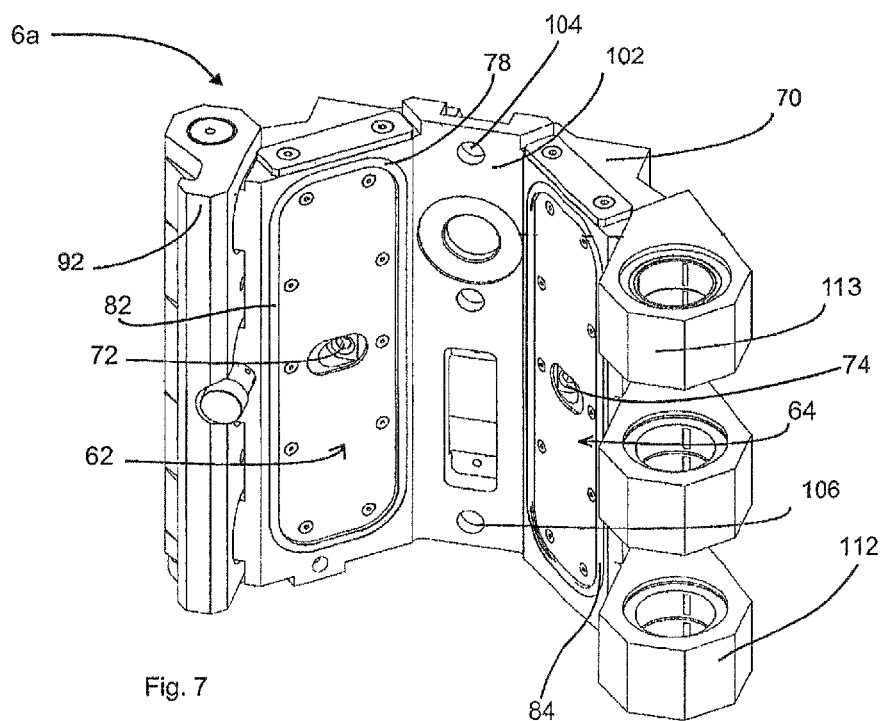
FIG. 7 is an illustration of a blow mould carrier part according to the invention.

FIG. 7 is a further illustration of a blow mould carrier part 6*a*. In this case the sealing devices 82, 84 are evident which form or bound the two pressure pad devices 62, 64 in each case here. The reference number 102 in turn designates the area which is situated between these two pressure pads and which is used for fastening the mould carrier shell part on the blow mould carrier part 6*a*. The sealing devices 82, 84 are here, as mentioned above, arranged in a flat region and are thus made two-dimensional, which is easier to produce than a three-dimensional shape, which extends for example on a curved wall.

The reference numbers 72, 74 designate in each case supply devices, by means of which the area which is surrounded by the sealing device 82 and which thus forms the pressure pads 62, 64, is acted upon with compressed air, in order to press apart the blow mould carrier shell part and the blow mould carrier part 6*a* in this way. The reference numbers 104 and 106 relate to through-openings through which the fastening means 88 are capable of extending. The reference number 113 in turn designates a suspension means to which the blow mould carrier part 6*a* is articulated, in order to be pivotable in this way. The fastening means can have spring devices 89 which produce a clamping force which draw the mould carrier shell 70*a* and the blow mould carrier part 6*a* together.

Figure 8:
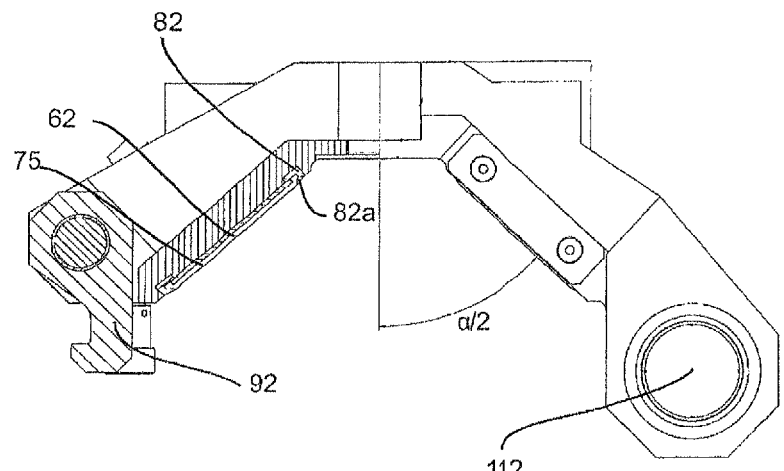
FIG. 8 is a top view of the blow mould carrier part shown in FIG. 7.

FIG. 8 is a top view of the apparatus shown in figure The reference number 82 in turn designates the sealing device and the reference number 75 a holding device by which the sealing device is held on the blow mould carrier part. This holding device 75 can be for example a plate which is screwed to the blow mould carrier part 6*a* by one or more screws and which clamps a portion of the continuous sealing device 82. A portion 82*a* (likewise continuous) of the sealing device 82 abuts against the blow mould carrier shell (not shown). The sealing devices are advantageously produced from an elastomer and preferably extend in one plane.

The reference α/2 designates the angle which is formed between the right-hand pressure pad and a perpendicular bisector. The total angle between these two pressure angles accordingly corresponds to that of the angle α.

In this way, the pressure pads have been divided here into two equal parts and put into a V-shaped arrangement at an optimum angle. In addition, the fastening means 88 or the holding means with positive locking mentioned above provide or provides a fixed position of the now simplified two-dimensional seal 82. More precisely, this fixed position can be produced by the holding device 75 which can be for example a plate.

Figure 9:
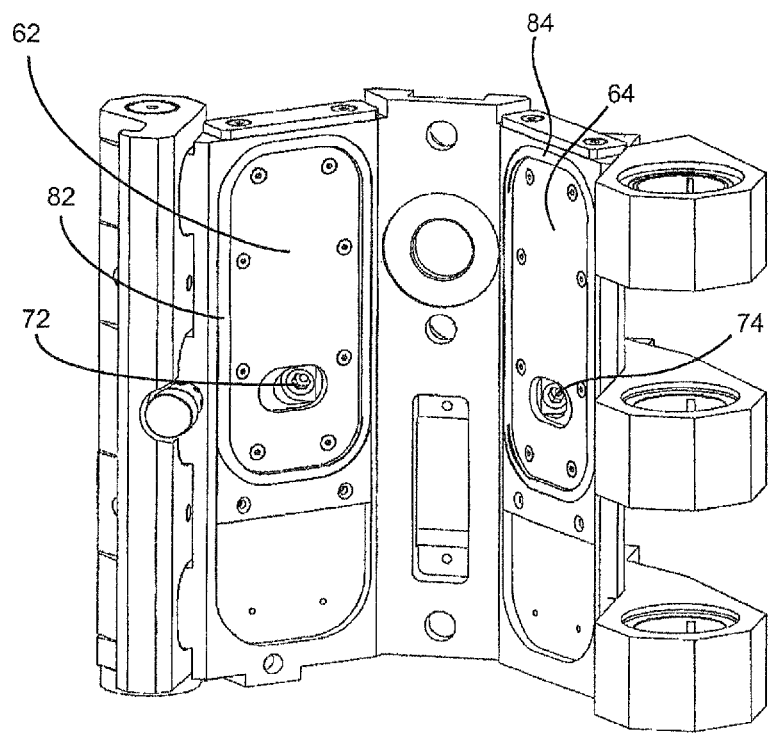
FIG. 9 is a further view of a blow mould carrier part according to the invention.

FIG. 9 shows a further embodiment of the apparatus according to the invention. It is evident that here the area surrounded by the sealing device 82 is reduced and thus also the pressure pad 62. The area of the pressure pad has thus been altered by the change of the sealing device 82 and, in this way, it is possible for the position of the application of force upon the blow mould carrier shells and also the magnitude of the force to be controlled in a purposeful manner. If desired, cross members could also extend through the respective pressure pad devices 62, in order to split the forces still further.

The Applicants reserve the right to claim all the features disclosed in the application documents as being essential to the invention, insofar as they are novel either individually or in combination as compared with the prior art.

LIST OF REFERENCES 1 shaping apparatus
2 conveying wheel, conveying device
4 blow mould
4a, b blow mould parts
5 stretch bar
6 blow mould carrier
6a, b blow mould carrier parts
8 shaping stations, blow moulding stations
9 guide cam
10 plastics material pre-forms
10a containers
11 follower device, portion
12 slide
13 floor
17 cover
18 wall
19 movable lateral wall
20 clean room
21 holding means
22 supply device
23 holding device
24 removal device
25 sealing device
26 carrier
27 sealing device
28 carrier
29 holding body
30 heating device
31 heating elements
32 sterilization device
34 conveying device
36 transfer unit
37 conveying wheel
40 filling device
42 transfer unit
44 conveying unit
50 plant
55 sterilization device
60 pressure pad arrangement
62, 64 pressure pad devices
70a, b blow mould carrier shell parts
72, 74 supply devices
75 holding device
82, 84 sealing devices
82a sealing portion
88 holding device, fastening means
92 locking element
94 locking element
102 area between the pressure pads
105 pivot shaft
104, 106 through-openings
112 pivot axis
113 suspension
114, 115 areas of the blow mould carrier shells
116 holding element
118 engagement means
182a, b sealing device (Std T)
B1, B2 regions
F1, F2 force components
Fres force
L line
UR peripheral direction
Y direction
α angle

The invention claimed is:

1. An apparatus for shaping plastics material pre-forms into plastics material containers with a blow mould which has at least two blow mould parts which are arranged so as to be movable with respect to each other and which in a closed state of the blow mould form a cavity, in the interior of which the plastics material pre-forms are capable of being expanded to form the plastics material containers by being acted upon with a flowable medium, wherein the first blow mould part is arranged on a first blow mould carrier part and the second blow mould part is arranged on a second blow mould carrier part and the first blow mould carrier part is movable with respect to the second blow mould carrier part in order to open and close the blow mould, and wherein a pressure pad arrangement is arranged between at least one blow mould carrier part and the blow mould part arranged on this blow mould carrier part, wherein a pressure pad of this pressure pad arrangement is capable of being acted upon with a flowable pressure medium, in order to force apart from each other the at least one blow mould carrier part and the blow mould part arranged on latter by a force acting between the blow mould carrier part and the blow mould part, wherein the pressure pad arrangement is designed in such a way that the force acting between the blow mould carrier part and the blow mould part has a first force component (F1) which acts in a first pre-set region (B1) in the peripheral direction of the blow mould part and a second force component (F2) which acts in a second pre-set region (B1) in the peripheral direction of the blow mould part, wherein tile first region (B1) and the second region (B2) are arranged at a distance from each other and the directions of the first force component (F1) and the second force component (F2) extend at an angle different from 0° with respect to each other, and wherein the pressure pad arrangement has a continuous sealing device which demarcates the space acted upon with the flowable pressure medium and this sealing device abuts against a flat wall area.

2. The apparatus according to claim 1, wherein the angle between the direction of the first force component (F1) and the direction of the second force component (F2) is between 10° and 170°.

3. The apparatus according to claim 1, wherein the pressure pad arrangement has a first pressure pad device and a second pressure pad device which are separated from each other at least in part and preferably completely.

4. The apparatus according to claim 3, wherein the apparatus has a first supply device, in order to supply the flowable medium to the first pressure pad device, and a second supply device separate from it, in order to supply the flowable medium to the second pressure pad device.

5. The apparatus according to claim 1, wherein the pressure pad arrangement is arranged between the blow mould carrier part and a carrier shell holding the blow mould part.

6. The apparatus according to claim 1, wherein the apparatus has a holding device for holding the carrier shell or the blow mould part on the blow mould carrier part, and this holding device is arranged in a peripheral direction of the blow mould between regions of the pressure pad arrangement.

7. The apparatus according to claim 3, wherein the holding device is arranged between the first pressure pad device and the second pressure pad device.

8. The apparatus according to claim 1, wherein at least one blow mould carrier part comprises at a side facing towards the blow mould part a V-shaped design.

9. The apparatus according to claim 1, wherein the angle between the direction of the first force component (F1) and the direction of the second force component (F2) is between 20° and 160°.

10. The apparatus according to claim 1, wherein the angle between the direction of the first force component (F1) and the direction of the second force component (F2) is between 30° and 150°.

11. The apparatus according to claim 1, wherein the angle between the direction of the first force component (F1) and the direction of the second force component (F2) is between 45° and 135°.

12. The apparatus according to claim 1, wherein the angle between the direction of the first force component (F1) and the direction of the second force component (F2) is between 60° and 120°.

13. The apparatus according to claim 1, wherein the angle between the direction of the first force component (F1) and the direction of the second force component (F2) is between 75° and 105°.

14. The apparatus according to claim 5, wherein the pressure pad arrangement comprises a first pressure pad device and a second pressure pad device, and a holding device is arranged between the first pressure pad device and the second pressure pad device.

15. An apparatus for shaping plastics material pre-forms into plastic material containers with a blow mould which has at least two blow mould parts which are arranged so as to be movable with respect to each other and which in a closed state of the blow mould form a cavity, in the interior of which the plastics material pre-forms are capable of being expanded to form the plastics material containers by being acted upon with a flowable medium, wherein the first blow mould part is arranged on a first blow mould carrier part and the second blow mould part is arranged on a second blow mould carrier part and the first blow mould carrier part is movable with respect to the second blow mould carrier part in order to open and close the blow mould, and wherein a pressure pad arrangement is arranged between at least one blow mould carrier part and the blow mould part arranged on this blow mould carrier part, wherein a pressure pad of this pressure pad arrangement is capable of being acted upon with a flowable pressure medium, in order to force apart from each other the at least one blow mould carrier part and the blow mould part arranged on latter by a force acting between the blow mould carrier part and the blow mould part, wherein the pressure pad arrangement is designed in such a way that the force acting between the blow mould carrier part and the blow mould part has a first force component (F1) which acts in a first pre-set region (B1) in the peripheral direction of the blow mould part and a second force component (F2) which acts in a second pre-set region (B1) in the peripheral direction of the blow mould part, wherein the first region (B1) and the second region (B2) are arranged at a distance from each other and the directions of the first force component (F1) and the second force component (F2) extend at an angle different from 0° with respect to each other and wherein the pressure pad arrangement has a first pressure pad device and a second pressure pad device which are separated from each other at least in part and preferably completely.

16. An apparatus for shaping plastics material pre-forms into plastics material containers with a blow mould which has at least two blow mould parts which are arranged so as to be movable with respect to each other and which in a closed state of the blow mould form a cavity, in the interior of which the plastics material pre-forms are capable of being expanded to form the plastics material containers by being acted upon with a flowable medium, wherein the first blow mould part is arranged on a first blow mould carrier part and the second blow mould part is arranged on a second blow mould carrier part and the first blow mould carrier part is movable with respect to the second blow mould carrier part in order to open and close the blow mould, and wherein a pressure pad arrangement is arranged between at least one blow mould carrier part and the blow mould part arranged on this blow mould carrier part, wherein a pressure pad of this pressure pad arrangement is capable of being acted upon with a flowable pressure medium, in order to force apart from each other the at least one blow mould carrier part and the blow mould part arranged on latter by a force acting between the blow mould carrier part and the blow mould part, wherein the pressure pad arrangement is designed in such a way that the force acting between the blow mould carrier part and the blow mould part has a first force component (F1) which acts in a first pre-set region (B1) in the peripheral direction of the blow mould part and a second force component (F2) which acts in a second pre-set region (B1) in the peripheral direction of the blow mould part, wherein the first region (B1) and the second region (B2) are arranged at a distance from each other and the directions of the first force component (F1) and the second force component (F2) extend at an angle different from 0° with respect to each other and wherein at least one blow mould carrier part comprises at a side facing towards the blow mould part a V-shaped design.

17. The apparatus according to claim 1, wherein forces, applied by the pressure pad, are divided into at least two components which act upon the first or the second blow mould carrier part or the blow mould respectively at different angles.

18. The apparatus according to claim 1, wherein the first and second force components are independent from each other and capable of being set with respect to their magnitude independently of each other.

19. The apparatus according to claim 1, wherein no force act at least locally in a peripheral direction between the first region (B1) and the second region (B2).

20. The apparatus according to claim 1, wherein the pressure pad arrangement has a first pressure pad device and a second pressure pad device which are separated from each other in part and connected to each other by a connecting portion which extends over less than 20% of a periphery of at least one of the first and second pressure pad device.

21. The apparatus according to claim 4, wherein the first and second pressure pad devices comprises supply ducts in each case which can be separated from each other completely.

* * * * *